US007028413B2

(12) United States Patent
Filipescu

(10) Patent No.: US 7,028,413 B2
(45) Date of Patent: Apr. 18, 2006

(54) LEVEL STAMP

(76) Inventor: Louis F. Filipescu, 2211 Arron St., Los Angeles, CA (US) 90026

( * ) Notice: Subject to any disclaimer, the term of this patent is extended or adjusted under 35 U.S.C. 154(b) by 24 days.

(21) Appl. No.: 10/946,150

(22) Filed: Sep. 20, 2004

(65) Prior Publication Data

US 2005/0034318 A1 Feb. 17, 2005

Related U.S. Application Data

(63) Continuation-in-part of application No. 10/603,452, filed on Jun. 24, 2003, now abandoned.

(51) Int. Cl.
*G01B 1/00* (2006.01)
(52) U.S. Cl. .............................. 33/528; 33/613; 33/666; 33/451
(58) Field of Classification Search .................. 33/613, 33/645, 451, 528, DIG. 10, 666, 669; 101/333, 101/327, 334, 405, 406
See application file for complete search history.

(56) References Cited

U.S. PATENT DOCUMENTS

| 564,342 | A | * | 7/1896 | Sherman | ....................... | 33/666 |
| 856,915 | A | * | 6/1907 | Saurbier | ...................... | 101/406 |
| 2,624,951 | A | * | 1/1953 | Morris | ........................ | 33/666 |
| 4,506,451 | A | * | 3/1985 | Hiltz | ............................ | 33/451 |
| 4,649,652 | A | * | 3/1987 | Dickinson et al. | ............ | 33/669 |
| 5,179,787 | A | * | 1/1993 | Ostrowski | ..................... | 33/613 |
| 5,357,683 | A | * | 10/1994 | Trevino | ...................... | 33/528 |
| 6,481,111 | B1 | * | 11/2002 | Myrick | ........................ | 33/526 |
| 2002/0078582 | A1 | * | 6/2002 | Krake et al. | .................. | 33/613 |
| 2002/0121205 | A1 | * | 9/2002 | Peterson | ..................... | 101/405 |
| 2004/0049936 | A1 | * | 3/2004 | Newman | ...................... | 33/613 |
| 2004/0216319 | A1 | * | 11/2004 | Muchnik | ..................... | 33/666 |
| 2005/0097765 | A1 | * | 5/2005 | Sorensen et al. | ............. | 33/666 |

* cited by examiner

*Primary Examiner*—Diego Gutierrez
*Assistant Examiner*—Travis Reis
(74) *Attorney, Agent, or Firm*—James E. Brunton

(57) ABSTRACT

A spirit level which includes an easy to operate, built in stamping mechanism that can be used by the individual user to mark a level line on a surface located adjacent the spirit level, such as a wall against which the level is engaged. The spirit level includes a plurality of conveniently located push pads that can be operated by the user to move a pre-inked stamping member from a normally retracted positioned into an extended marking position in engagement with a surface to be marked if desired.

17 Claims, 6 Drawing Sheets

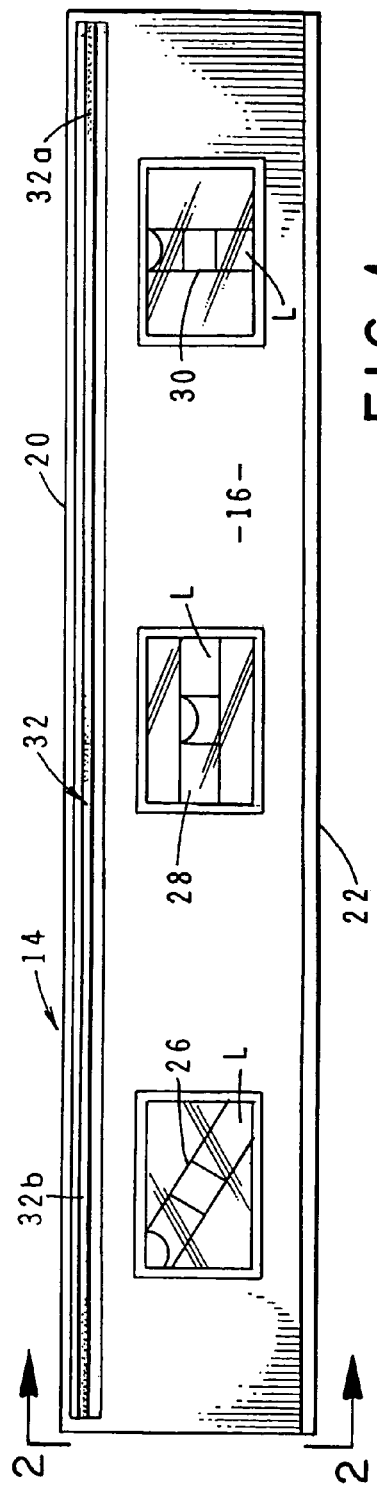
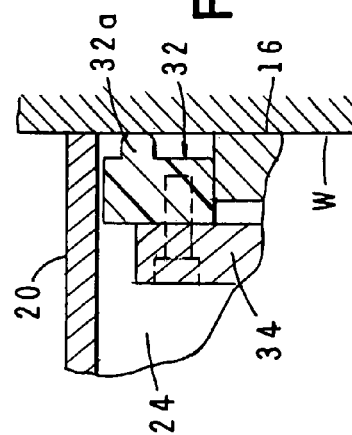
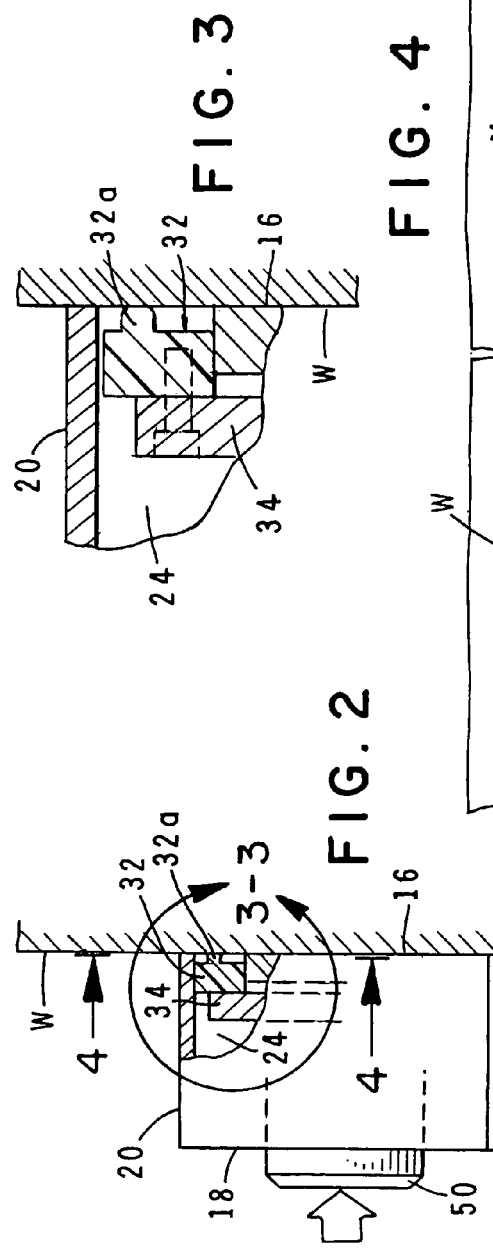
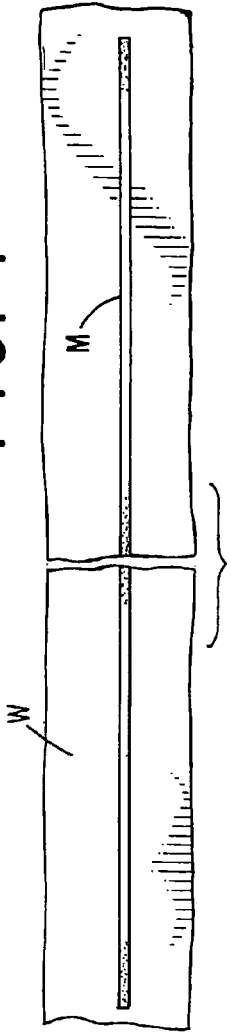

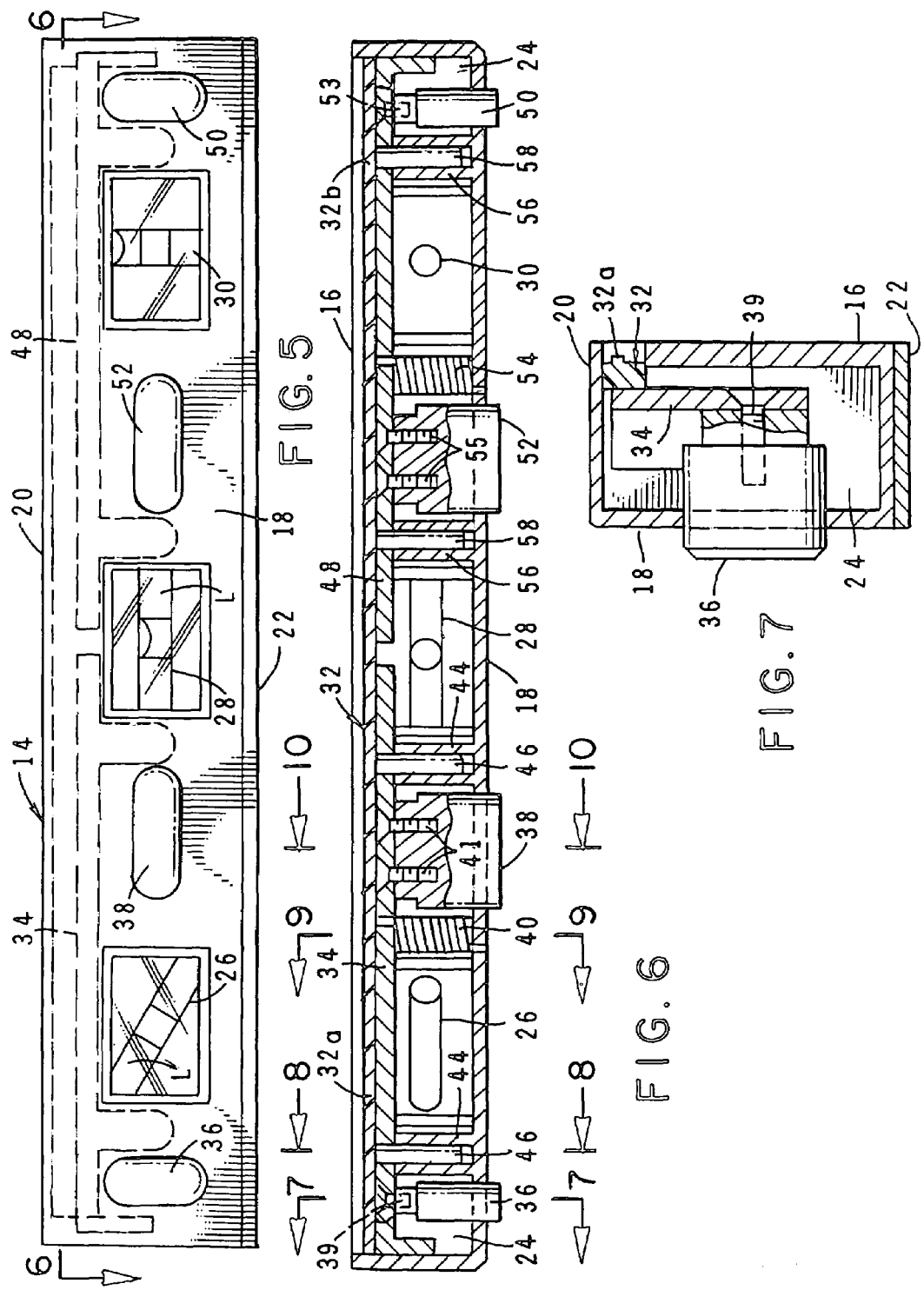

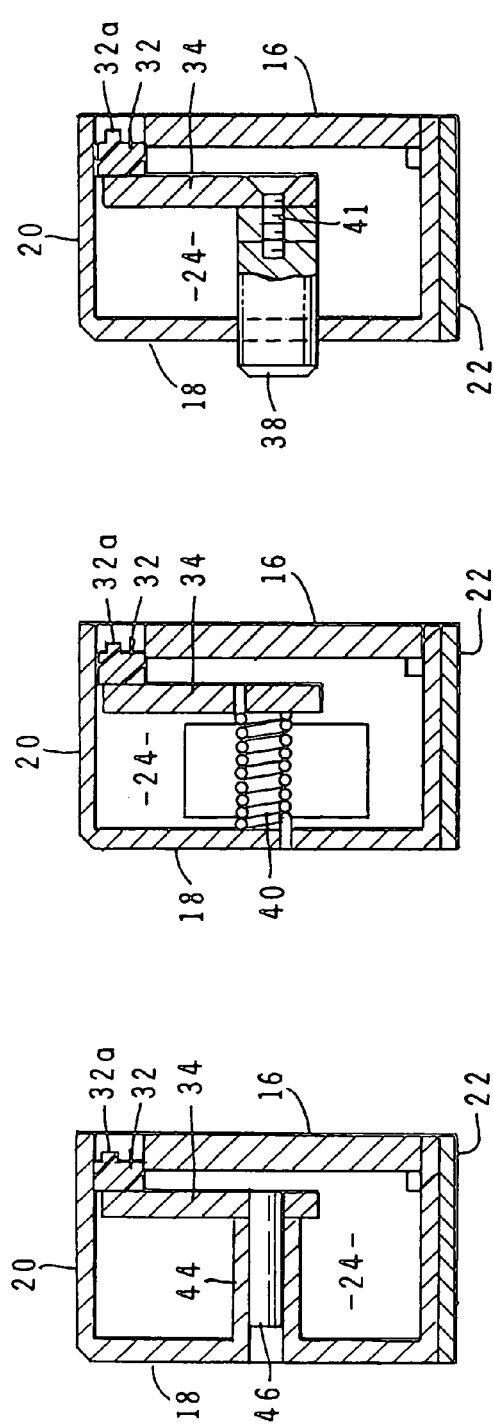
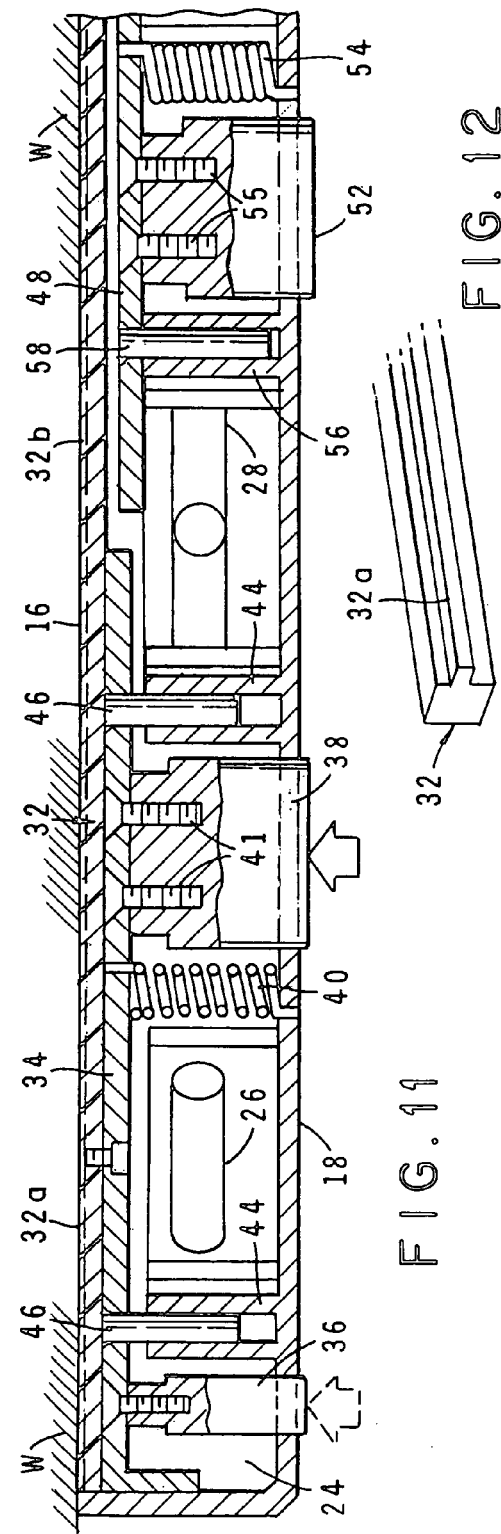

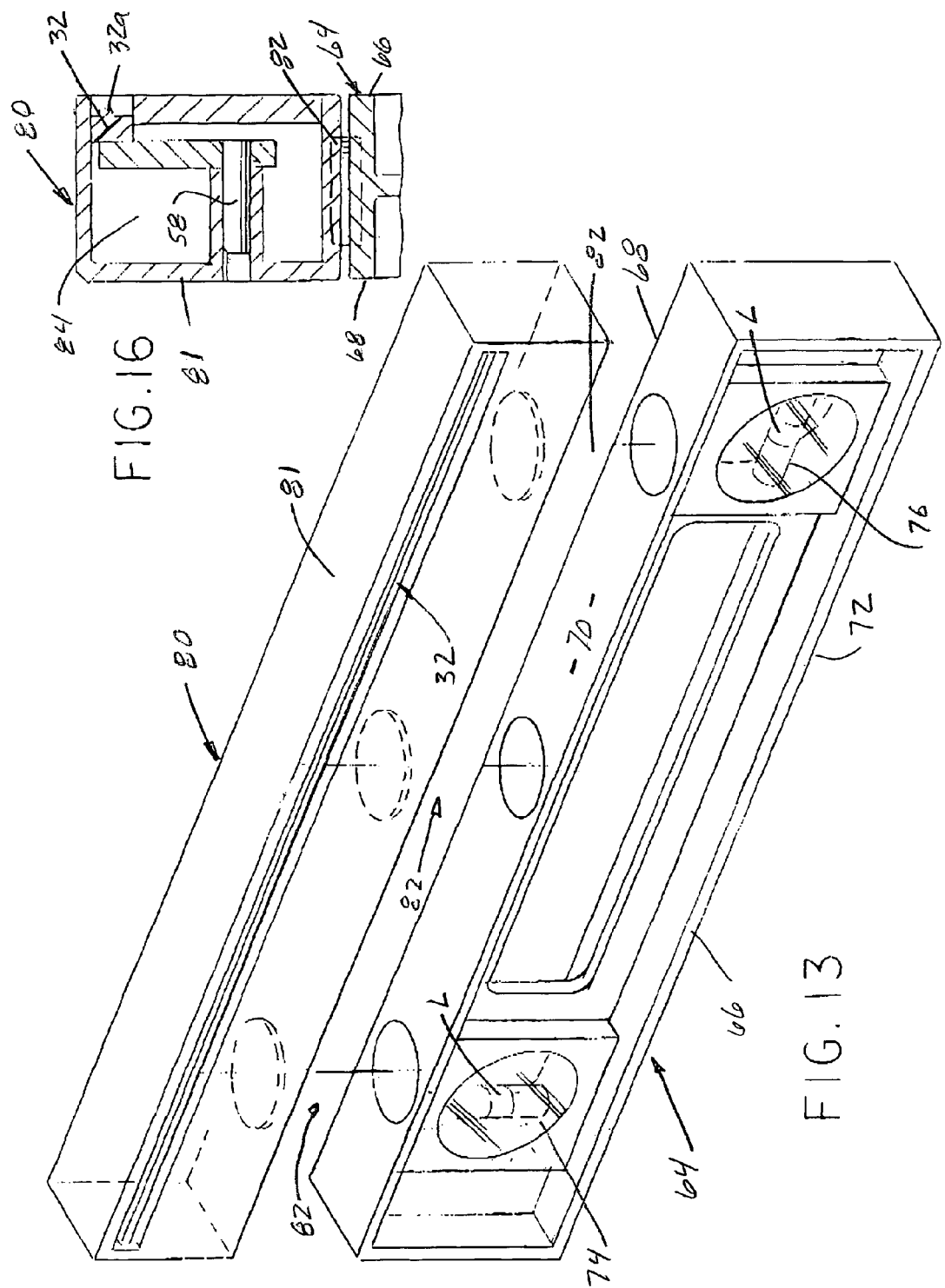

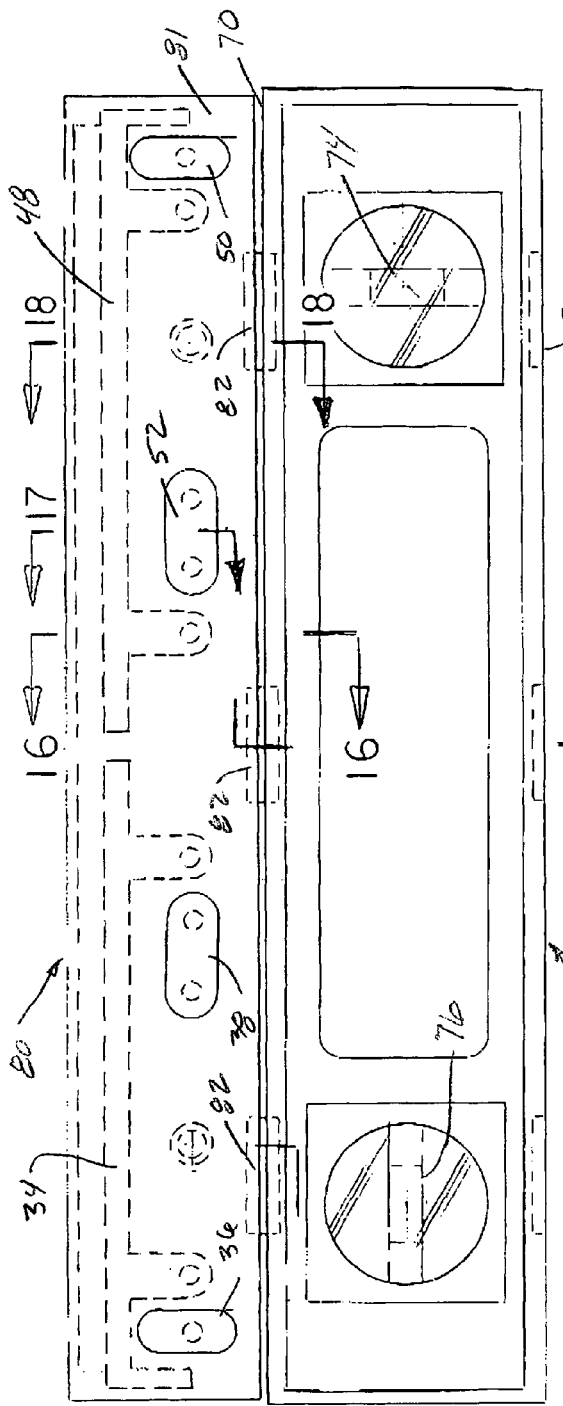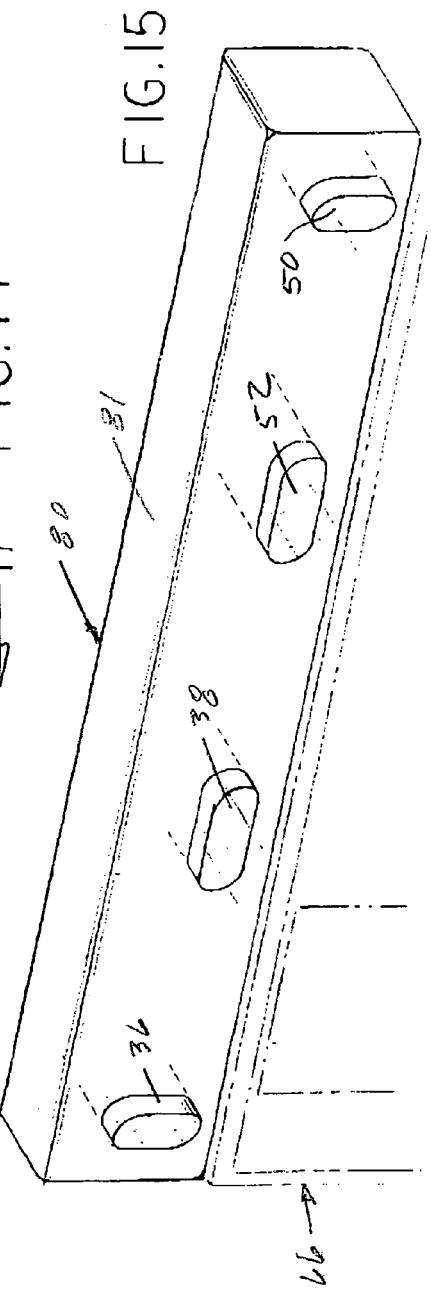

LEVEL STAMP

BACKGROUND OF THE INVENTION

This is a Continuation-In-Part of, U.S. Ser. No. 10/603,452 filed Jun. 24, 2003 now abandoned.

FIELD OF THE INVENTION

The present invention relates generally to spirit levels. More particularly, the invention concerns a modified spirit level that includes a retractable, pre-inked stamping member that can conveniently be used to mark a level line on a surface located adjacent the spirit level.

DISCUSSION OF THE PRIOR ART

Spirit levels (hereinafter called levels for short) of various types are well known in the prior art. Such devices have long been used by carpenters, bricklayers and other craftsmen for obtaining a true level. The typical prior art level comprises a glass bubble tube mounted within a housing typically constructed of wood, plastic or metal. The bubble tube is filled almost to capacity with a spirit or non-freezing liquid. The air bubble that remains within the tube moves toward that end of the tube which is raised above true level. When the air bubble is centered within the bubble tube, the construction of the level is such that the top and bottom walls of the level are positioned at true level. Some prior art levels carry one or more bubble tubes which enable the user to ascertain or to select the inclination of a surface or part relative to the horizontal and relative to the vertical.

U.S. Pat. No. 6,430,827 issued to Ruther discloses a spirit level that includes means for applying marks to selected portions of pieces of furniture and other articles. The Ruther apparatus includes an elongated housing having a rectangular cross sectional outline and provided with registering elongation slots in its front and rear walls. At least one follower of the level has a main portion slidably installed in the housing and one or two pointers outwardly adjacent the slot in the front wall. The two end pieces of the housing are provided with bubble tubes and each follower has a passage for introduction of a stylus or other suitable marking tool which can be inserted at the front wall to extend outwardly through the slot in the rear wall of the housing.

The patent to Richardson U.S. Pat. No. 2,972,816 relates generally to a device for aligning members with respect to each other and more particularly to a device for aligning to pieces of pipe at a predetermined angle with respect to each other. The device has bypass wall means for bypassing a fitting between the pieces of pipe.

Patent No. 746,070 issued to Gillner et al. discloses a center square having in combination therewith a scratch-pin and level and guide pins to permit parallel scribing, either straight or circular.

The thrust of the present invention is to provide a uniquely modified spirit level that includes a retractable, pre-inked stamping member that can conveniently be used by the individual to mark a reference line such as a level line on a surface located adjacent the spirit level, such as a wall against which the level is engaged. There is no need to use a pencil. The stamp can be used with one hand thereby freeing up the other hand.

SUMMARY OF THE INVENTION

It is an object of the present invention is to provide a spirit level which includes an easy to operate, built in stamping mechanism that can be used by the individual user to mark a level line on a surface located adjacent the spirit level, such as a wall against which the level is engaged.

Another object of the invention is to provide a level of the aforementioned character which can be manipulated by the user in the same manner as a standard level, but further exhibits the advantage of being able to use the level to mark on an adjacent surface a clearly discernible level line without the need to use a pencil.

Another object of the invention is to provide a modified spirit level which includes a plurality of conveniently located push pads that can be operated by only one hand of the user to move the pre-inked stamping member from a normally retracted position into an extended marking position in engagement with a surface to be marked.

Another object of the invention is to provide a level of the character described in the preceding paragraph in which the pre-inked stamping member is saturated with disappearing ink so that the imprinted mark will disappear within a short time.

Another object of the invention is to provide a level of the class described which can be used to apply a mark to selected surfaces with a high degree of accuracy and one which can be readily manipulated by workmen following only a minimum amount of training.

Still another object of this invention is to provide a level wherein the housing and the pre-inked stamping member can be assembled of simple massproduced parts at a reasonable cost.

Another object of the invention is to provide a level of the character described in which the stamping member is removably interconnected with the spirit level using permanent magnets.

By way of summary, the modified spirit level of the present invention comprises a housing having interconnected front, back, top and bottom walls defining an internal chamber, at least one bubble tube containing a liquid carried by the housing and an elongated stamping member also carried by the housing for movement between a first retracted position wherein at least a portion of the stamping member is disposed within the internal chamber and a second position wherein at least a portion of the stamping member extends outwardly from the front wall of the housing. The modified spirit level also includes a novel operating mechanism that is carried by the housing for moving the elongated stamping member from the first retracted position to the second position. In one form of the invention, the operating means comprises a plurality of spaced apart push pads that are carried by the housing and are operably associated with the stamping member. The push pads are individually movable between a first, at rest position and a second, operating position wherein the stamping member is moved toward the second position. Biasing means, in a form of a plurality of coil springs, are operably associated with the operating means for yieldably resisting movement of the elongated stamping member toward the second, stamping position.

BRIEF DESCRIPTION OF THE DRAWINGS

FIG. 1 is a rear view of one form of the modified spirit level of the present invention.

FIG. 2 is an enlarged view, partly in cross section, taken along lines 2—2 of FIG. 1.

FIG. 3 is a greatly enlarged, cross-sectional view of the area designated in FIG. 2 as "3—3".

FIG. 4 is a foreshortened view of the level line marked on the surface adjacent the front of the spirit level.

FIG. 5 is a front view of the spirit level shown in FIG. 1.

FIG. 6 is a cross-sectional view taken along lines 6—6 of FIG. 5.

FIG. 7 is an enlarged, cross-sectional view taken along lines 7—7 of FIG. 6.

FIG. 8 is an enlarged, cross-sectional view taken along lines 8—8 of FIG. 6.

FIG. 9 is an enlarged, cross-sectional view taken along lines 9—9 of FIG. 6.

FIG. 10 is an enlarged, cross-sectional view taken along lines 10—10 of FIG. 6.

FIG. 11 is an enlarged, fragmentary, cross-sectional view similar to FIG. 6, but showing the operation of the device to move the pre-inked stamp pad into engagement with a surface to be marked with a level line.

FIG. 12 is a generally perspective, fragmentary view of a portion of the pre-inked stamp pad of one form of the invention.

FIG. 13 is a generally perspective, exploded view of an alternate form of level assembly of the invention.

FIG. 14 is a front view of the level assembly shown in FIG. 13.

FIG. 15 is a fragmentary, generally perspective view of the stamping assembly of the level assembly shown in FIG. 1.

FIG. 16 is a cross-sectional view taken along lines 16—16 of FIG. 14.

DESCRIPTION OF THE INVENTION

Figure 17:
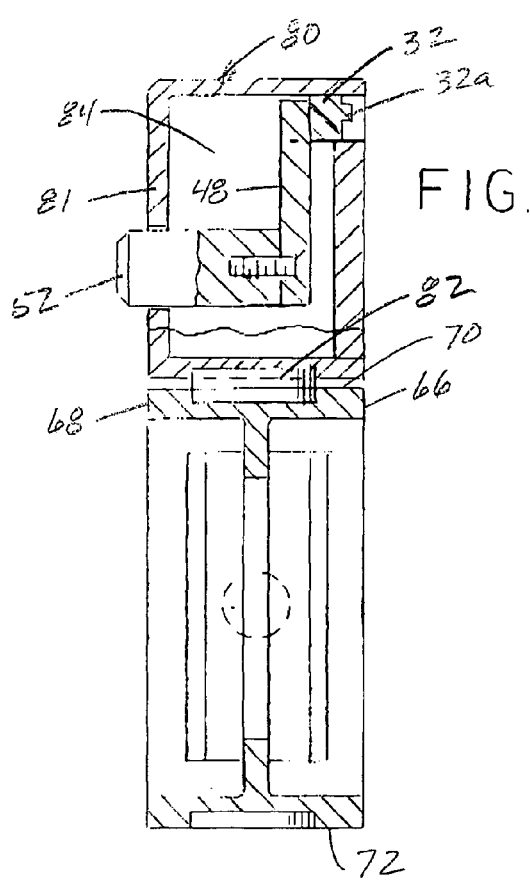
FIG. 17 is a cross-sectional view taken along lines 17—17 of FIG. 14.
Figure 18:
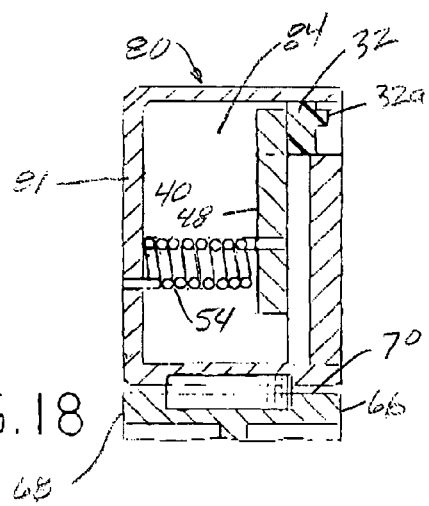
FIG. 18 is a cross-sectional view taken along lines 18—18 of FIG. 14.

Referring to the drawings and particularly to FIGS. 1 through 7, one form of the level stamp of the present invention is there illustrated. The level stamp here comprises a housing 14 having interconnected front, back, top and bottom walls 16, 18, 20, and 22 respectively defining an internal chamber 24 (FIGS. 2 and 6). Carried by housing 14 are first, second and third longitudinally spaced apart bubble tubes 26, 28 and 30 respectively, each containing a non-freezing liquid "L". As indicated in FIG. 1, bubble tube 26 extends angularly with respect to the top and bottom walls 20 and 22, bubble tube 28 extends substantially parallel to the top and bottom walls and bubble tube 30 extends substantially vertically relative to the top and bottom walls.

An elongated stamping member 32 having an inking segment 32a is carried by housing 14 proximate top wall 20. In a manner presently to be described, stamping member 32 is movable between a first retracted position, such as that shown in FIG. 7, wherein at least a portion of said stamping member is disposed within said internal chamber and a second position, such as that shown in FIG. 3, wherein at least a portion of segment 32a of the stamping member extends outwardly from the front wall of the housing.

Operating means of a character next to be described are carried by housing 14 for moving elongated stamping member 32 from the first retracted position to the second position. In the present form of the invention these novel operating means comprise a first push bar 34 that is carried within internal chamber 24 for movement between a first position shown in FIG. 6 and a second position shown in FIG. 11. As illustrated in FIGS. 6 and 11, first push bar 34 is in engagement with the left-hand portion 32a, as viewed in FIG. 6, of the stamping member 32. Operably associated with first push bar 34 are first and second push pads 36 and 38 that are carried by housing 14. Push pads 36 and 38, which are connected to first push bar 34 by threaded connectors 39 and 41, are movable between the first, at rest position shown in FIG. 6 and the second, operating position shown in FIG. 11 to cause push bar 34 to move toward the second position shown in FIG. 11. Biasing means, shown here as a conventional coil spring 40, which is operably associated with the first push bar 34, functions to yieldably resist movement of the push bar between the first position and the second position.

In the form of the invention shown in the drawings, the level further includes first guide means carried within said internal chamber of said housing for guiding movement of first push bar 34 between the first and said second positions. The first guide means here comprises a pair of longitudinally spaced guideways 44 that are mounted within internal chamber 24 and a pair of guide rods 46 that are connected to first push bar 34. As illustrated in FIG. 11, guide rods 46 are typically movable within the guideways 44 so as to control travel of the push bar within chamber 24.

In the present form of the invention the novel operating means also comprise a second push bar 48 that is carried within internal chamber 24 for movement between a first position shown in FIG. 6 and a second position shown in FIG. 11. As best seen in FIGS. 6 and 11, second push bar 48 is in engagement with the right-hand portion 32b of the stamping member 32. Operating associated with second push bar 48 are first and second push pads 50 and 52 that are carried by housing 14. Push pads 50 and 52, which are connected to second push bar 48 by threaded connectors 53 and 55, are movable between the first, at rest position shown in FIG. 6 and the second, operating position shown in FIG. 11 to cause push bar 48 to move toward the second position shown in FIG. 11. Biasing means, shown here as a conventional coil spring 54, which is operably associated with the second push bar 48, and functions to yieldably resist movement of the second push bar between the first position and the second position.

In the form of the invention shown in the drawings, the level further includes second guide means carried within said internal chamber of said housing for guiding movement of the second push bar 48 between the first and said second positions. The second guide means here comprises a pair of longitudinally spaced guideways 56 that are mounted within internal chamber 24 and a pair of guide rods 58 that are connected to second push bar 48. As illustrated in FIG. 11, guide rods 58 are telescopically movable within the guideways 56 so as to control travel of the second push bar within chamber 24.

In using the apparatus of the invention, the front side 16 of the level is placed in engagement with the wall "W" which is to be marked in a manner shown in FIGS. 2 and 11. Using the appropriate bubble tube, the level is next oriented into the desired position. For example, in the configuration shown in FIG. 11, the center bubble tube 28 has been used to bring the upper surface 20 of the level into true level. In this position, the stamp pad 32 is in the retracted position shown in FIG. 6. To then apply a mark, such as the mark "M" shown in FIG. 4 to the wall "W", a pressure is exerted on either of the push pads 36 or 38 in the direction of the arrows in FIG. 11. This pressure, which is exerted against the urging of coil spring 40, will cause push bar 34, along with and the stamp pad 32a, to move from the retracted position into the extended position shown in FIG. 11. As the stamp pad moves into the extended position its travel will be guided by the first guide means of the invention. Upon the inked marking segment of 32a (FIG. 12) of the stamp member engaging the wall "W", the mark "M" will be imprinted on the wall in the manner shown in FIG. 4. The marking portion of 32a of the stamp member, which can be constructed from felt, rubber, plastic or the like, can be pre-saturated with either conventional ink or with disappearing ink such as that readily commercially available from a number of different printing supply companies. When the disappearing ink is used, the mark will of course disappear from the wall after the passage of time.

It is to be understood that the mark can be imprinted on the wall in the manner described in the preceding paragraphs by also pushing on either or both of the push pads 50 and 52 against the urging of spring 54. When this is done, push bar 48, along with the inked segment 32a, will move from the retracted position shown in FIG. 6 into the extended position. As the stamp pad moves into the extended position its travel will be guided by the second guide means of the invention which is of the character previously described. Upon the inked marking segment of 32a (FIG. 12) of the stamp member engaging the wall "W", the mark "M" will be imprinted on the wall in the manner shown in FIG. 4.

Turning now to FIGS. 13 through 20, an alternate form of the level stamp of the present invention is there illustrated. This level stamp is similar in some respects to the level stamp shown in FIGS. 1 through 12 and like numbers are used in FIGS. 13 through 20 to identify like components. This latest form of the invention comprises a level housing 64 having interconnected front, back, top and bottom walls 66, 68, 70, and 72 respectively. Carried by level housing 64 are first and second longitudinally spaced apart bubble tubes 74 and 76 respectively, each containing a non-freezing liquid "L". As indicated in FIG. 13, bubble tube 74 extends substantially vertically relative to the top and bottom walls and bubble tube 76 extends substantially parallel to the top and bottom walls.

Figure 19:
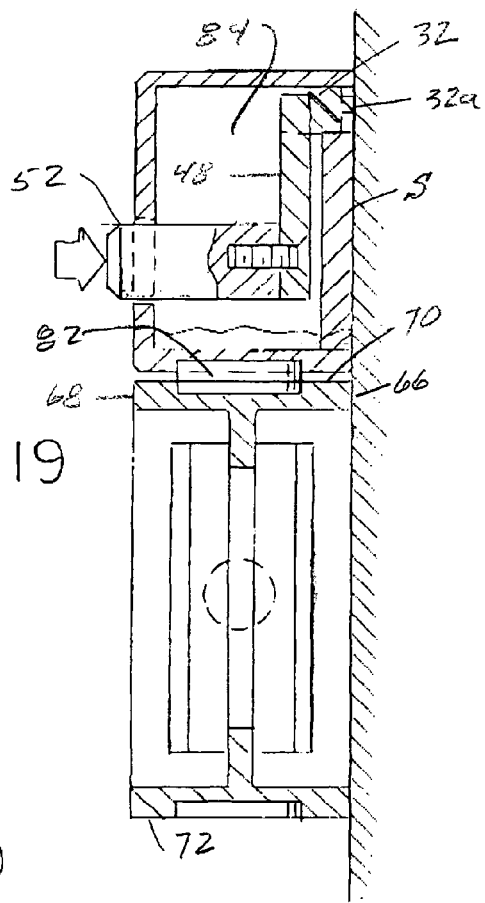
FIG. 19 is a cross-sectional view similar to FIG. 17, but showing the pre-inked stamp pad of the stamping assembly moved into engagement with the surface to be marked.
Figure 20:
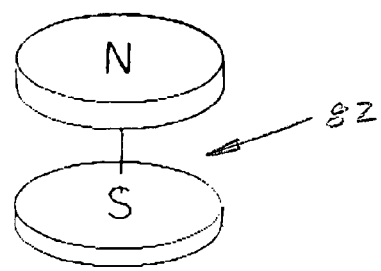
FIG. 20 is a generally perspective, exploded view of one of the sets of the permanent magnets of the invention.

A stamping assembly, 80, including a hollow housing 81 and an elongated stamping member 32 having an inking segment 32a of the character previously described is removably connected to top wall 70 by spaced apart sets of permanent magnets 82 (See FIG. 20). In a manner presently to be described, stamping member 32 is movable between a first retracted position, such as that shown in FIG. 17, wherein at least a portion of said stamping member is disposed within the internal chamber 84 of hollow housing 81 and a second position, such as that shown in FIG. 19, wherein at least a portion of segment 32a of the stamping member extends outwardly from the front wall of the housing and into engagement with the surface "S" to be marked.

Operating means of the same general character as earlier described herein are carried by housing 81 for moving elongated stamping member 32 from the first retracted position to the second position. In this latest form of the invention these novel operating means comprise a first push bar 34 that is carried within internal chamber 84 for movement between a first position shown in FIG. 17 and a second position shown in FIG. 19.

Operably associated with first push bar 34 are first and second push pads 36 and 38 that are carried by housing 81. Push pads 36 and 38, which are connected to first push bar 34 by suitable threaded connectors, are movable between the first, at rest position shown in FIG. 17 and the second, operating position shown in FIG. 19 to cause push bar 34 to move toward the second position shown in FIG. 19. Biasing means, shown here as a conventional coil spring, which is operably associated with the first push bar 34, functions to yieldably resist movement of the push bar between the first position and the second position.

In this latest form of the invention, the level assembly also includes first guide means carried within said internal chamber 84 of housing 81 for guiding movement of first push bar 34 between the first and said second positions. As before, the guide means here comprises a pair of longitudinally spaced guideways that are mounted within internal chamber 84 and a pair of guide rods that are connected to push bar 34. As illustrated in FIGS. 17 and 19, guide rods 46 are typically movable within the guideways so as to control travel of the push bar within chamber 84.

As before, in this latest form of the invention the novel operating means also comprise a second push bar 48 that is carried within internal chamber 84 for movement along second guide means, in the manner previously described, between a first position shown in FIG. 17 and a second position shown in FIG. 19.

Received within spaced apart cavities 87 formed in the lower surface of housing 82 are permanent magnets 90 of a first polarity. Adapted to mate with magnets 90 are spaced apart magnets 92 of a second, opposite polarity which are received within spaced apart cavities 93 formed in the top wall 70 of level housing 64. With this construction, when stamp housing 82 is moved into proximity with the upper wall 70 of the level housing, the magnets will attract so as to removably interconnect the stamp housing with the level.

In using the apparatus of this latest form of the invention, the stamp housing is first interconnected with the level in the manner shown in FIGS. 14, 15, 16, and 17. The assembly thus formed is then placed in engagement with the surface "S" to be marked (See FIG. 19). Using the appropriate bubble tube, the level is then oriented into the desired position. For example, in the configuration shown in FIG. 17, the bubble tube 76 has been used to bring the upper surface of the level into true level. In this position, the stamp pad 32 is in the retracted position shown in FIG. 17. To then apply a mark to the wall "W", a pressure is exerted on either of the push pads 36 or 38 in the direction of the arrows in FIG. 19. This pressure, which is exerted against the urging of coil spring 40, will cause push bar 34, along with and the stamp pad 33, to move from the retracted position into the extended position shown in FIG. 19. As the stamp pad moves into the extended position its travel will be guided by the first guide means of the invention. Upon the inked marking segment of 32a of the stamp member engaging the wall "W", the mark "M" will be imprinted on the wall in the manner shown in FIG. 19.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A level apparatus comprising:
  (a) a level housing having a top wall;
  (b) a first bubble tube containing a liquid carried by said level housing;
  (c) a stamping assembly removably connected to said level housing, said stamping assembly comprising:
    (i) a stamp housing;
    (ii) a single elongated stamping member carried by said stamp housing for movement between a first retracted position wherein at least a portion of said stamping member is disposed within an internal chamber and a second position wherein at least a portion of said stamping member extends outwardly from a front wall of said housing; and (d) operating means carried by said stamp housing for moving said elongated stamping member from said first retracted position to said second position wherein said operating means comprise a plurality of longitudinally spaced push pads carried by said housing and operably associated with said stamping member, each of said push pads being independently movable between a first at rest position and a second operating position wherein said stamping member is moved toward said second position.

2. The level as defined in claim 1 further including biasing means operably associated with said operating means for yieldably resisting movement of said elongated stamping member toward said second position.

3. The level as defined in claim 1 further including a second bubble tube containing a liquid carried by said housing.

4. The level as defined in claim 1 further including connection means for removably interconnecting said stamping assembly with said level housing, said connecting means comprising a plurality of permanent magnets.

5. A level apparatus comprising:
(a) a level housing having interconnected front, back, top and bottom walls;
(b) at least one magnet of a first polarity carried by said bottom wall of said level housing;
(c) a first bubble tube containing a liquid carried by said level housing;
(d) a stamping assembly removably connected to said level housing, said stamping assembly comprising:
 (i) a stamp housing;
 (ii) at least one magnet of a second polarity carried by said stamp housing;
 (iii) a single elongated stamping member carried by said stamp housing for movement between a first retracted position wherein at least a portion of said stamping member is disposed within an internal chamber and a second position wherein at least a portion of said stamping member extends outwardly from said front wall of said housing; and
(d) operating means carried by said stamp housing for moving said elongated stamping member from said first retracted position to said second position, said operating means comprising a plurality of push pads carried by said housing and operably associated with said stamping member, said push pads being movable between a first, at rest position and a second, operating position wherein said stamping member is moved toward said second position.

6. The level as defined in claim 5 in which said operating means further includes a push bar carried within said internal chamber for movement between a first position and a second position, said push bar being in engagement with said stamping member and also in engagement with said push pads.

7. The level as defined in claim 6, further including biasing means operably associated with said push bar for yieldably resisting movement thereof between said first position and said second position.

8. The level as defined in claim 7 further including guide means carried within said internal chamber for guiding movement of said push bar between said first position and said second position.

9. The level as defined in claim 8 in which said guide means comprises a plurality of guide rods mounted within said internal chamber of said housing.

10. A level comprising:
(a) a housing having interconnected front, back, top and bottom walls defining an internal chamber;
(b) a first bubble tube containing a liquid carried by said housing;
(c) a single elongated stamping member carried by said housing for movement between a first retracted position wherein at least a portion of said stamping member is disposed within said internal chamber and a second position wherein at least a portion of said stamping member extends outwardly from said front wall of said housing; and
(d) operating means carried by said housing for moving said elongated stamping member from said first retracted position to said second position, said operating means comprising;
 (i) a first push bar carried within said internal chamber for movement between a first position and a second position, said first push bar being in engagement with said stamping member;
 (ii) a plurality of push pads carried by said housing and operably associated with said first push bar, said push pads being movable between a first, at rest position and a second, operating position wherein said first to push bar is moved toward said second position; and
 (iii) biasing means operably associated with said first push bar for yieldably resisting movement thereof between said first position and said second position.

11. The level as defined in claim 10 further including first guide means carried within said internal chamber of said housing for guiding movement of said first push bar between said first position and said second position.

12. The level as defined in claim 11 in which said first guide means comprises a plurality of guideways mounted within said internal chamber of said housing and a plurality of guide rods connected to said first to push bar and a being reciprocally movable within said guideways.

13. The level as defined in claim 11, further including a second push bar carried within said internal chamber of said housing for movement between a first position and a second position, said second push bar being in engagement with said stamping member.

14. The level as defined in claim 13 further including second guide means carried within said internal chamber of said housing for guiding movement of said second push bar between said first position and said second position.

15. The level as defined in claim 14 in which said second guide means comprises a plurality of guideways mounted within said internal chamber of said housing and a plurality of guide rods connected to said second push bar and a being reciprocally movable within said guideways.

16. The level as defined in claim 15, further including a second bubble tube containing a liquid carried by said housing.

17. The level as defined in claim 16, further including a third bubble tube containing a liquid material carried by said housing.

* * * * *